United States Patent
Jarok et al.

(10) Patent No.: US 9,798,643 B2
(45) Date of Patent: Oct. 24, 2017

(54) SYSTEM AND METHOD OF MONITORING A SERIAL BUS

(71) Applicant: Goodrich Corporation, Charlotte, NC (US)

(72) Inventors: Jonathan C. Jarok, Chelmsford, MA (US); Scott W. Ramsey, Northbridge, MA (US)

(73) Assignee: Goodrich Corporation, Charlotte, NC (US)

( * ) Notice: Subject to any disclaimer, the term of this patent is extended or adjusted under 35 U.S.C. 154(b) by 187 days.

(21) Appl. No.: 14/802,764

(22) Filed: Jul. 17, 2015

(65) Prior Publication Data
US 2017/0017559 A1    Jan. 19, 2017

(51) Int. Cl.
| | | |
|---|---|---|
| *G06F 11/30* | (2006.01) | |
| *G06F 13/42* | (2006.01) | |
| *G06F 11/22* | (2006.01) | |
| *G06F 11/07* | (2006.01) | |
| *G06F 13/364* | (2006.01) | |
| *G06F 13/40* | (2006.01) | |

(52) U.S. Cl.
CPC ...... *G06F 11/3027* (2013.01); *G06F 11/0757* (2013.01); *G06F 11/221* (2013.01); *G06F 13/364* (2013.01); *G06F 13/404* (2013.01); *G06F 13/4282* (2013.01); *G06F 13/4291* (2013.01)

(58) Field of Classification Search
CPC ............ G06F 11/3055; G06F 11/3027; G06F 11/0757; G06F 11/0745; G06F 11/0751; G06F 11/0793; G06F 11/22; G06F 11/2733; G06F 11/3006; G06F 11/3051
See application file for complete search history.

(56) References Cited

U.S. PATENT DOCUMENTS

| | | | |
|---|---|---|---|
| 4,739,323 A | 4/1988 | Miesterfeld et al. | |
| 7,039,734 B2 | 5/2006 | Sun et al. | |
| 7,861,110 B2 | 12/2010 | Haley et al. | |
| 2004/0059852 A1* | 3/2004 | Sun | G06F 13/4291 710/110 |
| 2007/0043881 A1* | 2/2007 | Li | G06F 11/323 710/1 |
| 2009/0300277 A1 | 12/2009 | Jeddeloh | |

(Continued)

OTHER PUBLICATIONS

Extended European Search Report for European Patent Application 15179954/.9, dated Nov. 7, 2016.

*Primary Examiner* — Nadeem Iqbal
(74) *Attorney, Agent, or Firm* — Locke Lord LLP; Scott D. Wofsy; Joshua L. Jones

(57) ABSTRACT

A system and method are provided for managing internal-computer system communications in an SPI management system. The system includes a storage device, at least one serial bus interface to interface with a serial bus, and a processing unit that accesses via the at least one serial bus interface, master data propagating from a master device along the serial bus. The processing unit stores, in the storage device, at least one of timing and phase data related to clock pulses associated with the master data, and a phase relationship between the clock pulses and at least one of the master data and return data propagating from a slave device in response to the master data.

17 Claims, 4 Drawing Sheets

(56) References Cited

U.S. PATENT DOCUMENTS

2010/0180162 A1* 7/2010 Cardwell ............ G06F 11/0745
  714/47.1
2015/0032911 A1* 1/2015 Zhu .................... G06F 11/3027
  710/18
2015/0100716 A1* 4/2015 Rencs .................. G06F 13/385
  710/308

* cited by examiner

SYSTEM AND METHOD OF MONITORING A SERIAL BUS

FIELD OF THE INVENTION

The present disclosure relates to internal computer-system communications between master and slave devices, and more particularly, to monitoring a serial bus.

BACKGROUND OF THE INVENTION

A master device, e.g., a host device, can communicate with one or more slave devices, e.g., peripheral devices using a serial bus. For example, the master device can be a controller that controls a slave device, such as a motor. However, transmission errors, such as missing messages, corrupted messages, or messages sent to a wrong slave, can occur due to timing related problems. Examples of timing related problems include clock skew, jitter, data delay, or slave select errors. Timing problems can be caused, for example, by variations in distance between the master device and its different slaves. The current way to check for transmission errors is to log and post-process data using a costly logic analyzer or protocol analyzer. However, some errors can cause havoc or damage if not detected until post-processing is performed. In the above example in which a master controller controls a slave motor device, such as by sending a STOP command, post-processing may not avert the consequences of a missed or corrupted message. Rather, the motor could continue to operate even after a determination was made that the motor needs to be stopped.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a system and method for managing internal-computer system communications in an SPI management system computer system are disclosed. The system includes a storage device, at least one serial bus interface to interface with the serial bus, and a processing unit. The processing unit accesses via the at least one serial bus interface, master data propagating from a master device along the serial bus, and stores in the storage device at least one of timing and phase data related to clock pulses associated with the master data, and a phase relationship between the clock pulses and at least one of the master data and return data propagating from a slave device in response to the master data.

In embodiments, the at least one serial bus interface further can connect to the master device for serial connection between the master device and the serial bus. The processing unit and master device can be disposed on the same integrated circuit. The processing unit can further detect an error condition related to at least one of the master data and return data, and can store error data related to the error condition detected in the storage device. The processing unit can count the clock pulses, and the error condition detected can be related to at least one of a scenario in which the master data includes more than one slave select condition within a predefined time interval, and a scenario in which the number of clock pulses associated with a predetermined slave select index is within a predetermined range.

Additionally, in embodiments, the storage device can further store an association between slave select values and respective predetermined ranges of appropriate clock pulse, wherein the predetermined range can be selected based on a predetermined range associated with a value of a slave select included in the accessed data. The error condition can be based on a determination by the processing unit whether a message in the master data or return data has a parity error.

In embodiments, the serial bus can include first and second links, wherein at least one of the master data and return data can propagate along the first link, data propagating along the second link can be a copy of the master data or return data, and the error detection can be based on a comparison of the data propagating along the first and second links.

In addition, in embodiments, the processing unit can respond to a master query with at least one of timing and phase data, error data, and a copy of at least a portion of at least one of the master data and return data associated with the error condition. The processing unit can filter a message from at least one of the master data and return data based upon the detected error condition. The processing unit can further replace at least a portion of at least one of the master data and return data with at least a portion of the data propagating along the second link based upon the detected error condition.

Additionally, in embodiments, the processing unit can decode a message type associated with a message included in the master data, and the error condition can be detected based upon the message type. The processing unit can request that the master device request calibration data from the slave device, access return data from the slave device, wherein the return data includes the requested calibration data. The processing unit can further measure phase delay between the clock and the return data and store the measured phase delay as phase delay calibration data in association with the slave device.

Furthermore, in embodiments, during normal communication when the slave device responds to a read request from the master device by transmitting return data, the processing unit can access the return data, and measure the phase delay between the return data and the clock. The processing unit can further compare the measured phase delay with the phase delay calibration data associated with the slave device, and detect an error condition based on a difference between the measured phase delay and the phase delay calibration data relative to a predetermined threshold. The system can further include an interrupt communication link between the processing unit and the master device. The processing unit can transmit an interrupt via the interrupt communication link to the master based on detection of the error condition.

BRIEF DESCRIPTION OF THE DRAWINGS

So that those having ordinary skill in the art, to which the present disclosure pertains, will more readily understand how to employ the novel system and methods of the present certain illustrated embodiments, the embodiments thereof will be described in detail herein-below with reference to the drawings, wherein.

DETAILED DESCRIPTION OF CERTAIN EMBODIMENTS

Figure 1:
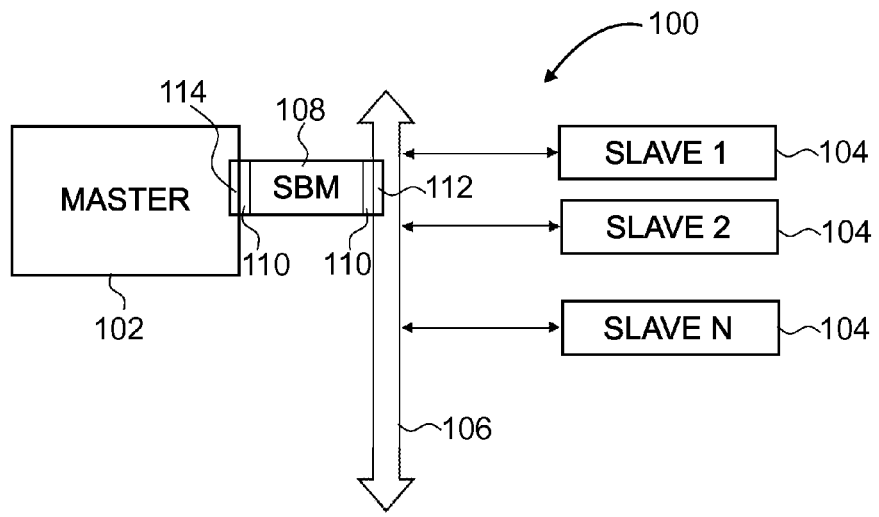
FIG. 1 illustrates a system diagram of an embodiment of a serial bus monitoring system in accordance with the present disclosure.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to relating to below illustrated embodiments. Although any methods and materials similar or equivalent to those described herein can also be used in the practice or testing of the below illustrated embodiments, exemplary methods and materials are now described.

It must be noted that as used herein and in the appended claims, the singular forms "a," "an," and "the" include plural referents unless the context clearly dictates otherwise. Thus, for example, reference to "a stimulus" includes a plurality of such stimuli (and equivalents known to those skilled in the art) and reference to "the signal" includes reference to one or more signals (and equivalents thereof known to those skilled in the art), and so forth.

It is to be appreciated that certain embodiments described herein can be utilized in conjunction with a software algorithm, program, or code residing on a computer useable medium having control logic for enabling execution on a machine having a computer processor. As used herein, the term "software" is meant to be synonymous with any code or program that can be executed a processor e.g., of the host processor, regardless of whether the implementation is in hardware, firmware or as a software computer product available on a disc, a memory storage device, for download from a remote machine, etc. One skilled in the art will appreciate further features and advantages of the certain embodiments described herein, thus the certain illustrated embodiments are not to be understood to be limited by what has been particularly shown and described, except as indicated by the appended claims.

As will be appreciated from the below description of certain illustrated embodiments, the methods described herein off-load work from a computer processor by functioning as an intermediary, managing communication to and from devices in a computer system and/or in a computing environment.

Figure 2:
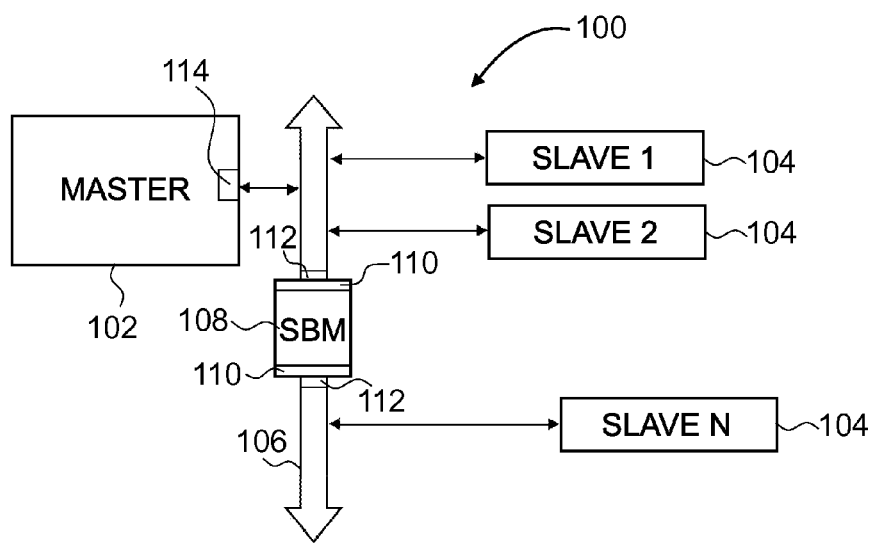
FIG. 2 illustrates a system diagram of another embodiment of the serial bus monitoring system shown in FIG. 1.

Turning now descriptively to the drawings, with reference to FIGS. 1 and 2, an exemplary serial communication system 100 is shown in which a master device 102 communicates with one or more slave devices 104 via serial bus 106. The serial bus 106 can include one or more bus interfaces 112 that can couple with an interface associated with another device. The coupling between a bus interface 112 and another interface can include mating by a physical connection or a wireless connection. A serial bus monitor (SBM) 108 is coupled in series between the master device 102 and the serial bus 106 via first and second interfaces 110. In an embodiment shown in FIG. 1, the first interface 110 mates with a bus interface 112 provided on the serial bus 106. The slave devices 104 communicate with the serial bus 106, such as via a slave device interface and a compatible bus interface (not shown).

In an embodiment shown in FIG. 2, the SBM 108 is coupled in series with the serial bus 106 via two first interfaces 110. In an embodiment shown in FIG. 2, each of the first interfaces 110 of the SBM 108 mates with a respective bus interface 112 provided on the serial bus 106. The master device 102 communicates with the serial bus 106, such as via a master device interface 114 and a compatible bus interface (not shown in this embodiment). Similar to FIG. 1, the slave devices 104 communicate with the serial bus 106, such as via a slave device interface and a compatible bus interface (not shown).

Figure 3:
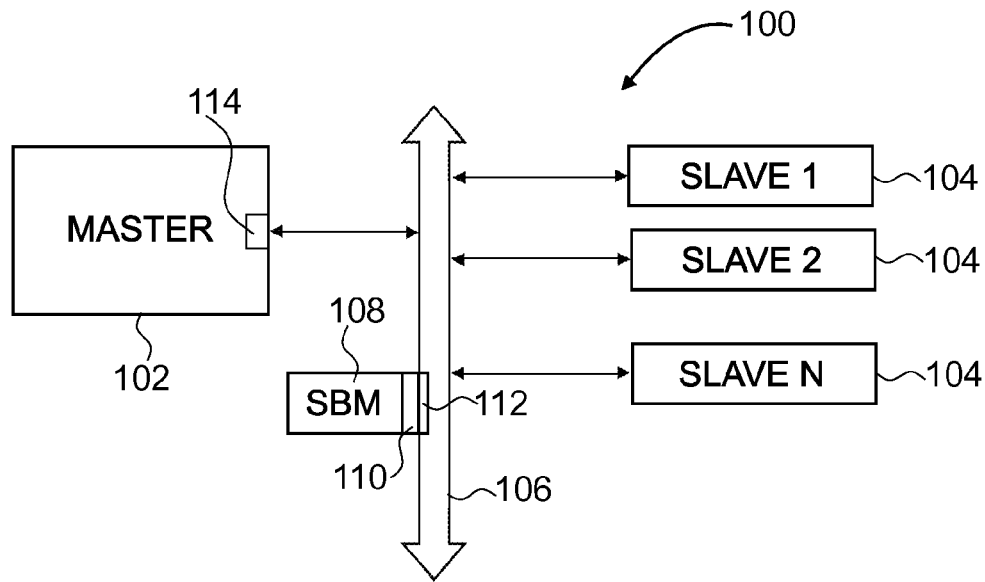
FIG. 3 illustrates a system diagram of a further embodiment of the serial bus monitoring system shown in FIG. 1.

In an embodiment shown in FIG. 3, the SBM 108 is coupled in parallel with the serial bus 106 via a single instance of first interface 110. The first interface 110 of the SBM 108 mates with a bus interface 112 provided on the serial bus 106. The master device 102 communicates with the serial bus 106, such as via a master device interface 114 and a compatible bus interface (not shown in this embodiment). Similar to FIG. 1, the slave devices 104 communicate with the serial bus 106, such as via a slave device interface and a compatible bus interface (not shown).

Figure 4:
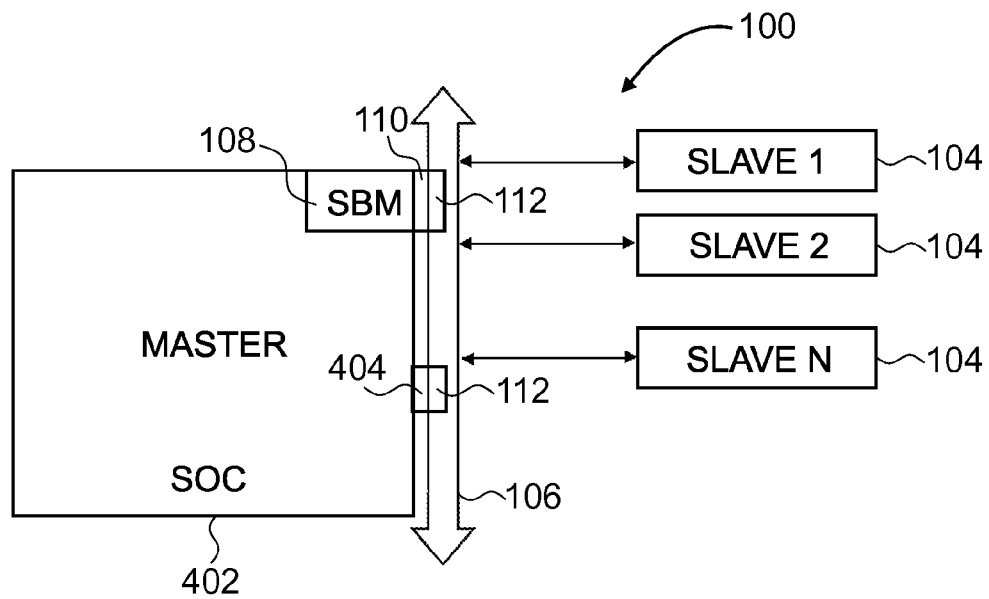
FIG. 4 illustrates a system diagram of another embodiment of the serial bus monitoring system shown in FIG. 1.

In an embodiment shown in FIG. 4, the master device is embodied in a system-on-chip (SOC) 402. The term SOC as used herein can refer to a system-on-chip or a system-on-module (SOM). The SBM 108 is mounted on the SOC 402 and is included as a component of the SOC 402. When the SOC is embedded within a host device, such as a mobile phone or controller device, the SBM 108 is embedded in the host device. When the SBM 108 is mounted on the SOC 402 the SBM 108 is physically connected to the SOC 402 and the master device. The SOC 402 communicates with the serial bus 106 via an SOC interface 404 that mates with a bus interface 112. The SBM 108 can communicate with the serial bus 106 via the SOC interface 404 and/or via the first interface which mates with another bus interface 112. Similar to FIG. 1, the slave devices 104 communicate with the serial bus 106, such as via a slave device interface and a compatible bus interface (not shown).

Figure 5:
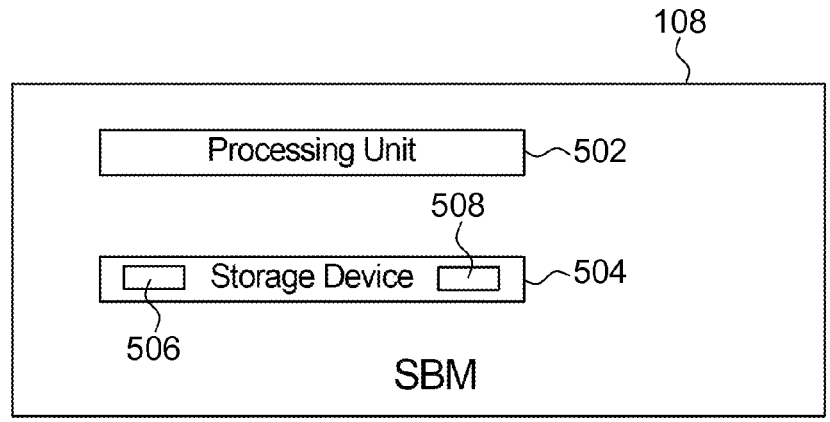
FIG. 5 illustrates a block diagram of an example serial bus monitor shown in FIGS. 1-4.

With reference to FIG. 5, the SBM 108 further includes a processing unit 502, storage device 504, and at least one first interface 110 for coupling with a bus interface 112 or a master interface (not shown). Alternatively or additionally, depending on the architecture of SBM 108, the SBM 108 can further include an embedded bus interface module or bus interface unit 510 that interfaces with a bus interface (not shown). The processing unit 502 accesses, via one of the first interfaces 110, master data and clock pulses that propagate from the master device 102 along the serial bus 106. The processing unit 502 stores in the storage device 504 timing and/or phase data. The timing data is related to clock pulses associated with the master data and/or return data propagating from a slave device, e.g., in response to a request from the master device 102. The phase data indicates a phase relationship between the clock pulses and at least one of the master data and the return data. The SBM 108 can further calculate and store error data and statistical data related to the timing data and phase data. The detected errors can include, for example, more than one slave being active at once, detection of a collision, or occurrence of activity of the clock and/or data while no slaves are selected. The statistical data can include, for example, frequency each slave is active, amount of time each slave is active, amount of data each slave received, amount of time the bus is utilized, and time interval between messages.

The SBM 108 can be a digital processing element, such as a field-programmable gate array (FPGA), an application-specific integrated circuit (ASIC), a microprocessor, or a microcontroller.

The processing device 502 and the storage device 504 can be included in components provided in the FPGA, ASIC, microcontroller, or microprocessor. For example, the storage device 504 can be a RAM storage device, such as DRAM, flash RAM, double-data RAM, and distributed RAM.

In an embodiment, the serial bus 106 is a serial peripheral interface (SPI) that uses SPI protocol. In an embodiment, the serial bus 106 can include an SPI cluster and/or an SPI cluster electrical interface, such as described in U.S. patent application Ser. No. 14/461,086. In other embodiments, the serial bus can use serial protocols, such as UART, i2C, CAN, or SSI, without limitation thereto.

The processing unit 502 can detect an error condition related to at least one of the master data and return data, and stores in the storage device 504 error data related to the error condition detected.

Detection of an error condition can include detection of an event in which the master data includes more than one slave select condition within a predefined time interval or a predefined number of clock pulses. Detection of another error condition can include detection of whether the number of clock pulses counted during a slave select condition is within a predetermined range. In both of these examples of error detection, the processing unit 502 counts clock pulses and detects slave select signals or pulses. This error detection does not require reading data included in the master data.

The storage device 504 can store in data structure 506 a plurality of predetermined ranges of a number of appropriate clock pulses and an association between the predetermined ranges and respective slave select values. Data structure 506 can be any data structure that associates a first value with a second value, for example a lookup table (LUT). Once the processing unit 502 determines a slave select value, the processing unit 502 can determine what the associated predetermined range is for that slave select value.

In an embodiment, an error condition can be based on a determination by the processing unit 502 whether a message in the master data or return data has a parity error.

Figure 6:
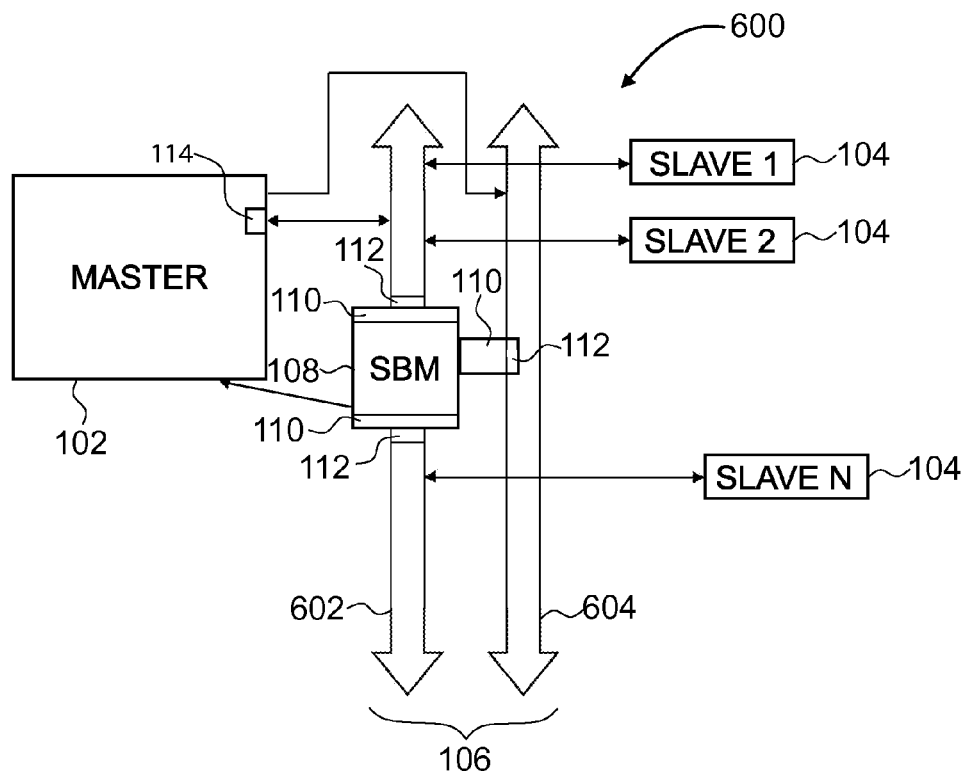
FIG. 6 illustrates a further system diagram of another embodiment of the serial bus monitoring system shown in FIG. 1.

FIG. 6 shows an embodiment in which the serial bus includes a first link 602 and a second link 604, wherein the master data propagates along the first link 602, and at least one redundant copy of the master data propagates along the second link 604. The second link 604 can be a wired or wireless link. In embodiments, a plurality of redundant links similar to the second link 604 can be provided. The master device 102 communicates with the first and second links 602, 604, such as via one or more master device interfaces 114 and respective compatible bus interfaces provided on the first and second links 602, 604 (not shown in this embodiment).

The processing unit 502 performs error detection by comparing the data propagating along the first link 602 and second links 604. The comparison can be a binary comparison to determine if a binary value in corresponding bits of the master data and the redundant data is the same. An error condition or indication of an error indication is detected if the comparison results in a determination that the data propagating along the first link is not the same as the data propagating along the second link.

In an embodiment, the processing unit 502 can decode messages included in the master data. An error condition can be detected based upon a message type of a decoded message. In an embodiment, the processing unit 502 can store the master data in the storage device 504 for later processing. In an embodiment in which redundant data is propagated along a second link 604, the processing unit 502 can also store the redundant data in the storage device 504 for later processing. Error detection can be performed by a host computer that can access or receive the master data and/or redundant data that is stored in the storage device 504. The processing unit 502 can flag portions of the master data and/or redundant data stored by the storage device 504 associated with a detected error. In an embodiment, a portion of the master data and/or redundant data is only stored upon detecting an error condition, wherein the portion includes the data associated with detection of the error condition.

In an embodiment, the processing unit 502 can be queried by the master device 102. The master query can request information about error detection. The master device 102 can treat the SBM 108 as a slave device and query the SBM 108 in the same manner as querying a slave device 104. The master query can merely request whether an error was detected, or the master query can request information about the error(s) detected, such as a statistic or a copy of the corrupted data.

In an embodiment, the processing unit 502 can set a flag when an error occurs. When a master query is received, the processing unit 502 responds based on the status of the flag. Upon reporting the occurrence of an error in response to a master query, the processing unit 502 can reset the flag.

In a further embodiment, the processing unit 502 can respond to a master query, depending on the nature of the query, with a captured copy of a message that includes a detected error or with a statistic associated with the error. The detected errors can include, for example, more than one slave being active at once, detection of a collision, or occurrence of activity of the clock and/or data while no slaves are selected. The statistical data can include, for example, frequency each slave is active, amount of time each slave is active, amount of data each slave received; amount of time the bus is utilized, and time interval between messages. The detected errors can include, for example, more than one slave being active at once, detection of a collision, or occurrence of activity of the clock and/or data while no slaves are selected. The statistical data can include, for example, frequency each slave is active, amount of time each slave is active, amount of data each slave received, amount of time the bus is utilized, and time interval between messages. In a further embodiment, when the processing unit 502 detects an error it can filter a message that includes an error so that it is not propagated any further along the serial bus 106.

In an embodiment in which redundant data is propagated along the second link 604, the processing unit 502 can replace a message of the master data that has a detected error with a corresponding message included in the redundant data.

In the embodiments in which the processing unit 502 filters or replaces a message that includes a detected error, unlike methods that use post processing, the SBM 108 can intercept the message before it is transmitted to the target slave device 104.

In an embodiment, an interrupt communication link 606 is provided between the processing unit 502 and the master device 102. The processing unit 502 can transmit an interrupt via the interrupt communication link 606 to the master device 102 when an error or a certain type of error is detected.

Delays can be induced in communication with a slave device 104 based on factors such as distance of the slave device 104 from the serial bus 106 and the nature of the link between the slave device 104 and the serial bus 106. The SBM 108 can monitor return data from a slave device 104 that is responsive to a read request from the master device 102. Additionally, the SBM 108 can be calibrated for detecting errors related to the return data by detecting and accounting for inherent delays associated with communications between the serial bus 106 and the slave device 104.

Figure 7:
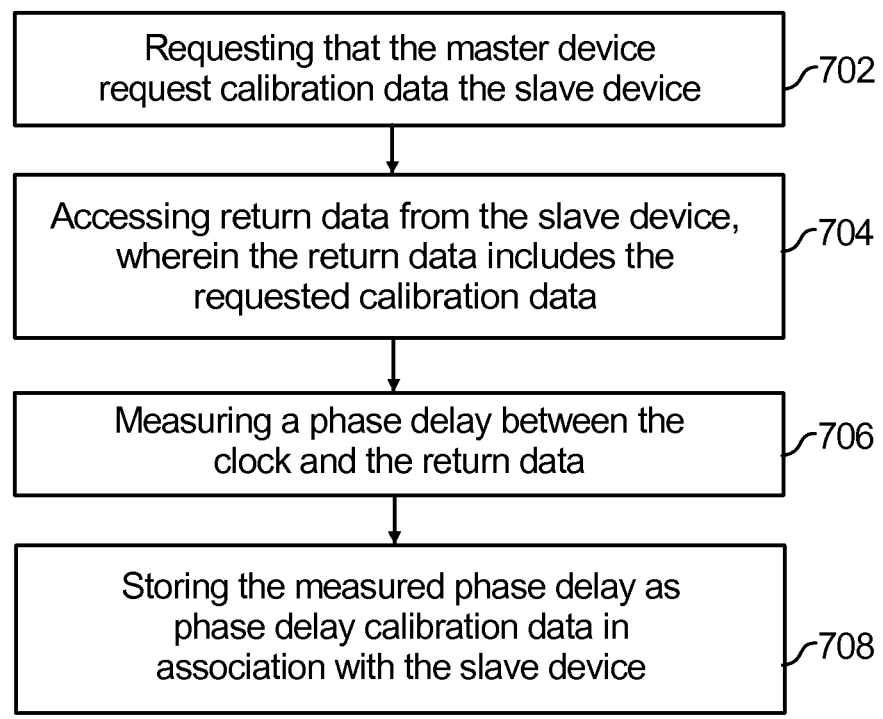
FIG. 7 illustrates a flowchart of operations of calibrating the serial bus monitor, in accordance with an embodiment of the present disclosure.

With reference now to FIG. 7, shown is a flowchart demonstrating implementation of the various exemplary embodiments for calibrating the SBM 108. It is noted that the order of steps shown in FIG. 7 is not required, so in principle, the various steps may be performed out of the illustrated order. Also certain steps may be skipped, different steps may be added or substituted, or selected steps or groups of steps may be performed in a separate application following the embodiments described herein.

At operation 702, the processing unit 502 can request that the master device 102 request calibration data from a predetermined one of the slave devices 104. The request can be transmitted, for example, via an interface 110 and master device interface 114 or via a different interface.

At operation 704, the SBM 108 accesses, while monitoring the serial bus 106, return data from the predetermined slave device, wherein the return data includes the requested calibration data. The calibration data is predetermined and known by the SBM 108.

At operation 706, the SBM 108 measures phase delay between the clock and the return data. When the SBM 108 is close to the slave devices, operation 706 can be omitted because the master device 102 would detect a different relationship. It can be beneficial to perform operation 706 when the serial communication system 100 is configured similarly to the configuration shown in FIG. 4.

At operation 708, the SBM 108 stores in data structure 508 the measured phase delay as phase delay calibration data that is associated with the predetermined slave device 104. The method can be repeated for a plurality of slave devices 104 so that phase delay calibration data can be stored in association with each of the slave devices 104.

During normal operation when one of the slave devices 104 responds to a read request from the master device 102 by transmitting return data, the SBM 108 monitors the serial bus 106 and accesses the return data. The SBM 108 measures the phase delay between the return data and the clock. The SBM 108 compares the measured phase delay with the phase delay calibration data associated with the slave device 104 that transmitted the return data. The SBM 108 can determine that an error occurred if a difference between the measured phase delay and the phase delay calibration data exceeds a predetermined threshold. The SBM 108 can treat error detection of return data similarly to error detection of the master data described above, including setting a flag when an error is detected, storing a message associated with an error detection, responding to the master device 102 with notification that an error occurred and/or the corrupted message or related statistics, filtering the corrupted message, and/or correcting the defective message in a situation in which a redundant link is provided for propagation of redundant return data.

In accordance with an embodiment, the SBM 108 can be included in a loop-back mode for calibration and testing. For example, with respect to calibration, the SBM 108 can be used with an SPI controller that has a dynamic clock delay element and read calibration controller module. During a loop-back mode in which a calibration operation is performed, the SPI controller (which functions as a master device) can calibrate its timing using clock delay elements to compensate for measured phase differences. The SBM 108 can be incorporated to detect timing related errors.

With respect to testing, many engineers test both a transmit side and a receive side of a SPI communication system. Incorporation of the SBM 108 with the SPI bus or master device during testing would allow testing of both software and hardware without the need for additional slave devices or other hardware components.

The techniques described herein are exemplary, and should not be construed as implying any particular limitation of the certain illustrated embodiments. It should be understood that various alternatives, combinations, and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A system for monitoring a serial bus, the system comprising:
   a storage device;
   at least one serial bus interface to interface with the serial bus; and
   a processing unit accessing, via the at least one serial bus interface, master data propagating from a master device along the serial bus, and storing in the storage device at least one of timing and phase data related to clock pulses associated with the master data and a phase relationship between the clock pulses and at least one of the master data and return data propagating from a slave device in response to the master data,
   wherein the processing unit counts the clock pulses, and an error condition is determined when at least one of:
   (a) the master data indicates that more than one slave device has been selected within a predefined time interval or a predefined number of clock pulses counted by the processing unit, and (b) detection of a number of the clock pulses counted during which no slave devices are selected within a predetermined range.

2. The system according to claim 1, wherein the at least one serial bus interface further connects to the master device for serial connection between the master device and the serial bus.

3. The system according to claim 1, wherein the processing unit and master device are disposed on the same integrated circuit.

4. The system according to claim 1, wherein the processing unit further detects an error condition related to at least one of the master data and return data, and stores in the storage device error data related to the error condition detected.

5. The system according to claim 4, wherein the error condition is based on a determination by the processing unit whether a message in the master data or return data has a parity error.

6. The system according to claim 1, wherein the serial bus includes first and second links, wherein at least one of the master data and return data propagates along the first link, and data propagating along the second link is a copy of the master data or return data, and the error detection is based on a comparison of the data propagating along the first and second links.

7. The system according to claim 4, wherein the processing unit responds to a master query with at least one of timing and phase data, error data, and a copy of at least a portion of at least one of the master data and return data associated with the error condition.

8. The system according to claim 4, wherein the processing unit filters a message from at least one of the master data and return data based upon the detected error condition.

9. The system according to claim 6, wherein the processing unit replaces at least a portion of at least one of the master data and return data with at least a portion of the data propagating along the second link based upon the detected error condition.

10. A system for monitoring a serial bus, the system comprising:
 a storage device;
  at least one serial bus interface to interface with the serial bus; and
  a processing unit accessing, via the at least one serial bus interface, master data propagating from a master device along the serial bus, and storing in the storage device at least one of timing and phase data related to clock pulses associated with the master data and a phase relationship between the clock pulses and at least one of the master data and return data propagating from a slave device in response to the master data, wherein the processing unit decodes a message type associated with a message included in the master data, and a error condition is detected based upon the message type.

11. A system for monitoring a serial bus, the system comprising:
 a storage device;
  at least one serial bus interface to interface with the serial bus; and
  a processing unit configured to:

access, via the at least one serial bus interface, master data propagating from a master device along the serial bus;
store in the storage device at least one of timing and phase data related to clock pulses associated with the master data and a phase relationship between the clock pulses and at least one of the master data and return data propagating from a slave device in response to the master data;
requesting that the master device request calibration data from the slave device;
accessing return data from the slave device, wherein the return data includes the requested calibration data;
measuring phase delay between the clock and the return data; and
storing the measured phase delay as phase delay calibration data in association with the slave device.

12. The system according to claim 11, wherein during normal communication when the slave device responds to a read request from the master device by transmitting return data, the processing unit accesses the return data; measures the phase delay between the return data and the clock; compares the measured phase delay with the phase delay calibration data associated with the slave device; and detects an error condition based on a difference between the measured phase delay and the phase delay calibration data relative to a predetermined threshold.

13. The system according to claim 4, wherein the system further includes an interrupt communication link between the processing unit and the master device, and the processing unit transmits an interrupt via the interrupt communication link to the master based on detection of the error condition.

14. A method for monitoring a serial bus, the method comprising:
 accessing a master data propagating from a master device along a serial bus;
 storing at least one of timing and phase data related to clock pulses associated with the master data and a phase relationship between the clock pulses and at least one of the master data and return data propagating from a slave device in response to the master data;
 requesting that the master device request calibration data from the slave device;
 accessing return data from the slave device, wherein the return data includes the requested calibration data;
 measuring a phase delay between the clock and the return data; and
 storing the measured phase delay as phase delay calibration data in association with the slave device.

15. The method according to claim 14, further comprising:
 detecting an error condition related to at least one of the master data and return data; and
 storing in the storage device error data related to the error condition detected.

16. The method according to claim 14, further comprising responding to a master query with at least one of timing and phase data, error data, and a copy of at least a portion of at least one of the master data and return data associated with the error condition.

17. The method according to claim 14, comprising filtering a message from at least one of the master data and return data based upon the detected error condition.

* * * * *